(12) United States Patent
Hansen

(10) Patent No.: US 12,527,695 B2
(45) Date of Patent: Jan. 20, 2026

(54) ELASTIC NONWOVEN SHEET

(71) Applicant: Fibertex Personal Care A/S, Aalborg Ost (DK)

(72) Inventor: Morten Rise Hansen, Aalborg (DK)

(73) Assignee: FIBERTEX PERSONAL CARE A/S, Aalborg Ost (DK)

( * ) Notice: Subject to any disclaimer, the term of this patent is extended or adjusted under 35 U.S.C. 154(b) by 440 days.

(21) Appl. No.: 17/972,601

(22) Filed: Oct. 25, 2022

(65) Prior Publication Data

US 2023/0141900 A1     May 11, 2023

(30) Foreign Application Priority Data

Nov. 10, 2021 (EP) ..................................... 21207488

(51) Int. Cl.
*A61F 13/15* (2006.01)
*A61L 15/24* (2006.01)
*C08L 23/16* (2006.01)

(52) U.S. Cl.
CPC .. *A61F 13/15585* (2013.01); *A61F 13/15731* (2013.01); *A61L 15/24* (2013.01); *C08L 23/16* (2013.01); *A61F 2013/15959* (2013.01); *C08L 2203/02* (2013.01); *C08L 2203/12* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 2004/0127128 A1* | 7/2004 | Thomas | D04H 1/43838 442/361 |
| 2010/0105273 A1* | 4/2010 | Motomura | B32B 5/26 442/329 |
| 2014/0072788 A1 | 3/2014 | Burkhart et al. | |
| 2016/0166443 A1* | 6/2016 | Arora | A61F 13/5146 604/378 |
| 2018/0002850 A1 | 1/2018 | Hansen et al. | |
| 2019/0233993 A1 | 8/2019 | Sommer et al. | |
| 2019/0233994 A1 | 8/2019 | Sommer et al. | |
| 2020/0307146 A1 | 10/2020 | Wagner et al. | |

FOREIGN PATENT DOCUMENTS

| | | |
|---|---|---|
| JP | 2007321292 A | 12/2007 |
| JP | 2007321293 A | 12/2007 |
| JP | 2008106378 A | 5/2008 |
| JP | 2013517393 A | 5/2013 |
| JP | 2018024965 A | 2/2018 |
| JP | 2019131945 A | 8/2019 |

(Continued)

OTHER PUBLICATIONS

Extended European Search Report issued in corresponding European Patent Application No. 21207488.4 dated May 11, 2022 (6 pages).

(Continued)

*Primary Examiner* — Shawn McKinnon
(74) *Attorney, Agent, or Firm* — Kilyk & Bowersox, P.L.L.C.

(57) ABSTRACT

The invention relates to elastically stretchable nonwoven sheets comprising an elastically stretchable nonwoven layer and a stretchable facing layer, and an in-line method for making such sheets.

17 Claims, 11 Drawing Sheets

(56) References Cited

FOREIGN PATENT DOCUMENTS

Figure 1:
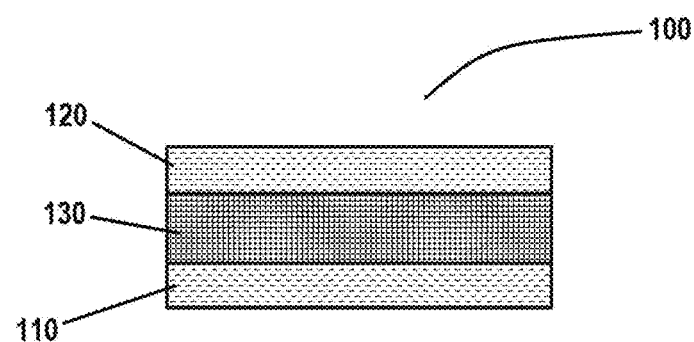

| | | |
|---|---|---|
| JP | 2019131946 A | 8/2019 |
| JP | 2021161593 A | 10/2021 |
| WO | 2010039583 A1 | 4/2010 |
| WO | 2020187540 A1 | 9/2020 |
| WO | 2021065446 A1 | 4/2021 |

OTHER PUBLICATIONS

Third Party Submission issued in corresponding Japanese Patent Application No. 2022-170353 dated Feb. 8, 2024 (6 pages).
Third Party Submission issued in corresponding Japanese Patent Application No. 2022-170353 dated Sep. 7, 2023 (46 pages).
Office Action issued in corresponding Indian Patent Application No. 202214060695 dated Oct. 6, 2025 (6 pages).

\* cited by examiner

ELASTIC NONWOVEN SHEET

This application claims priority to European Patent Application No. 21 207 488.4, filed Nov. 10, 2021, incorporated in its entirety by reference herein.

The invention relates to elastically stretchable nonwoven sheets comprising an elastically stretchable nonwoven elastic layer and a stretchable nonwoven facing layer, and an in-line method for making such sheets.

Nonwoven sheets are used in the hygiene industry as materials for making baby diapers and adult incontinence products on a large scale. In many instances, for example to make back-ears in open diapers or waist belt portions in diaper pants, however, elastically stretchable materials are required and standard nonwoven sheets do not meet that requirement.

Traditional approaches to address the problem of a limited elastic stretch of the nonwoven sheets comprise including an elastic film between layers of nonwoven material. The resulting laminates can have good elastic performance, but elastic films are not air permeable and this can lead to discomfort to the wearer. Another approach comprises including elastic strands, typically referred to as Lycra strands, into the sheets. The drawback of this method is a localized elastic force that may also lead to discomfort to the wearer, and a proneness of the strands to break during production.

Additionally, the incorporation of an elastic film or strand renders the sheets elastic, but only within the boundaries of the maximum stretch of the nonwoven materials associated with the elastic film or strand. Most traditional nonwoven materials have elongation at break values of around 50-80% in machine-direction (MD) and 70-100% in cross-machine direction (CD) (WSP 110.4) maximum, and most usually even less, meaning that they only elongate to a very limited extent before they are destroyed. For the applications specified above, however, the sheets would be required to elastically stretch for 150% of their original dimension (to 250% of their original dimension) and, depending on the specific application, this requirement can apply to cross-machine directional or machine directional stretch. For example, for making a traditional open or taped baby diaper, typical production processes require the material used for a back ear to exhibit an elastic stretch in that magnitude in CD. For making adult or baby diaper pants, on the other hand, typical production processes require the material used for elastic applications therein, like belts, to exhibit an elastic stretch in that magnitude in MD.

The traditional approach to address the problem of limited stretch of the nonwoven materials is pleating the nonwoven sheets upon lamination to the elastic film or strand. This way, the lack of extensibility of the nonwoven material itself is compensated by storing additional material in each pleat. The disadvantage of pleating, however, is the need for more material during production and the higher thickness of the final product, which is negatively perceived by the consumer due to increased thermal insulation and more visible appearance.

More recent approaches use inherently elastically stretchable nonwoven materials. These sheets comprise at last one stretchable but not in itself very elastic nonwoven facing layer and an elastic nonwoven layer.

An off-line process for producing such an elastically stretchable nonwoven sheet is disclosed in WO 2020/187540 A1. The method comprises using a pre-fabricated facing layer formed from crimped fibers and depositing elastic fibers thereon in a spunbonding process for forming a spunbonded elastic layer. The sheet is then pre-stretched in a pair of corrugated rollers. Resulting products can elastically stretch for 150% or even more of their original dimension in CD, insofar meeting the industry requirements, but elastic stretch in MD has proven more limited. The potential to obtain higher MD stretches is limited for the off-line process because the pre-fabricated facing layers have shown to lose quite some of their ability to stretch when they are run through a production line a second time.

An in-line process for producing elastically stretchable nonwoven sheets is disclosed in EP 3 715 517 A1. The method uses a multi-beam spunbonding line to manufacture a sheet comprising stretchable facing layers formed form crimped fibers and an elastic layer formed from elastic fibers in the same line before calender bonding and pre-stretching the materials. The products resulting from this process have shown satisfactory ability to stretch in CD, but likewise fall short in ability to stretch in MD.

There is hence still a need in the hygiene industry for nonwoven sheets having a higher inherent ability to elastically stretch in machine direction.

In this context, the present invention proposes an elastically stretchable nonwoven sheet comprising at least two layers of nonwoven materials, wherein one layer is an elastically stretchable nonwoven comprising spunbonded elastic fibers formed from a thermoplastic elastomer polymer material, wherein one layer is a stretchable facing layer comprising spunbonded crimped multicomponent fibers, wherein adjacent layers are bonded together by embossed bonding points, and wherein at least one of the components of the crimped multicomponent fibers is a propylene-α-olefin copolymer material.

When compared to the nonwoven sheets disclosed in EP 3 715 517 A1, which use polypropylene for both components of the bicomponent fibers of the facing layer, the use of a propylene-α-olefin copolymer (co-PP) in at least one of the components of the bicomponent fibers surprisingly leads to a significant increase in overall elasticity of the sheet, especially in machine direction (MD). Specifically, target values of elongation at break of beyond 150%, preferably beyond 200% when measured according to WSP 100.4 have been achieved for such sheets in MD.

The sheets according to the invention preferably show advantageous elasticity behaviour especially in machine direction.

In one embodiment, permanent deformation in machine direction as measured according to ASTM D5459 after the first cycle is less than 15%, preferably less than 10%, more preferably less than 5%.

In one embodiment, the area between the increasing and decreasing machine-directional stress-strain curves of a hysteresis plot in a second cycle of an ASTM D5459 test, as expressed in the relative size of the area between the curves (A) in relation to the overall area under the initial increasing curve (A+B), expressed in % [A/(A+B)×100], is lower than 40%, preferably lower than 30%.

The two or more components of the bicomponent fibers are asymmetrically arranged over the cross-section of the fiber. In a preferred embodiment the multicomponent fibers are bicomponent fibers. A standard and in many cases preferred option are side-by-side bicomponent fibers, but the inventive concept is not limited to side-by-side fibers and may also be realized with other cross-sections like, for example, eccentric-sheath-core.

The nonwoven materials of both the facing layer and the elastic layer are spunbonded nonwovens, and the nonwoven sheet is preferably altogether a spunbonded nonwoven sheet.

The α-olefin co-forming the copolymer with the propylene is preferably ethylene. In other words, the copolymer is preferably a poly(propylene-ethylene) copolymer. Likewise preferably, the copolymer is a random copolymer.

The co-monomer content in the propylene-α-olefin copolymer, or ethylene content in the poly(propylene-ethylene) copolymer, is preferably $\geq 1$ wt.-%, more preferably $\geq 2$ wt.-%. As an upper limit, the co-monomer content can be $\leq 8$ wt.-%, preferably $\leq 6$ wt.-% The other one of the components of the crimped multicomponent fiber is preferably a polypropylene homopolymer (PP). A polypropylene homopolymer herein is understood as having a monomer purity of greater 99.5 wt.-%, preferably greater 99.8 wt.-%, more preferably greater 99.9 wt.-%.

The use of bicomponent fibers using polypropylene as one component and a poly(propylene-ethylene) copolymer as the other component has experimentally been demonstrated to lead to an emphasized increase in MD stretch.

In a further preferred embodiment, the molecular weight distribution, as expressed by polydispersity ($M_w/M_n$), of the propylene-α-olefin copolymer is broader than the molecular weight distribution of the other component(s) of the crimped multicomponent fibers, preferably the polypropylene homopolymer used in the other component of the bicomponent fiber.

In terms of concrete numbers, the difference in $M_w/M_n$ between the two polymers is preferably $\geq 1$, more preferably $\geq 2$ and most preferably $\geq 3$. On the other hand, the difference in $M_w/M_n$ between the two polymers is preferably $\leq 10$ and preferably $\leq 8$. Suitable absolute numbers for $M_w/M_n$ can range, for example, from 2,5 to 7,5 for the polypropylene and from 4 to 10 for the propylene-α-olefin copolymer.

The co-PP or the homo-PP of the components of the multicomponent fiber may be blended with additional polymers or other additives like slip agents, filler materials or colour masterbatches, but should account for more than 50% by weight of the respective component, preferably for more than 75% and more preferably for more than 90%.

Within the crimped bicomponent fibers, the weight ratio of the co-PP component to the other component, preferably homo-PP component in the bicomponent fibers preferably lies between 20/80 and 80/20, more preferably between 30/70 and 70/30, and yet more preferably between 40/60 and 60/40.

The thermoplastic elastomer material forming for the elastic fibers can comprise a thermoplastic polyolefin elastomer (TPE-o), preferably a thermoplastic polyolefin elastomer comprising propylene-α-olefin copolymers. Suitable TPE-o materials for use in the context of the present invention are dis-closed in EP 2 342 075 A1. Alternatively or additionally, meaning as a mixture, other thermoplastic elastomer materials like especially thermoplastic polyurethanes (TPU) or styrenic block copolymers (TPE-s) may be used. In one embodiment, up to 20 wt.-% and preferably up to 10 wt.-% of a thermoplastic olefin, such as a homopolypropylene may be contained in the thermoplastic elastomer material next to the thermoplastic elastomer. Also additives such as, for example, filers, slip agents or colour masterbatches can be added. In one embodiment, a bicomponent elastic fiber can be formed from two different thermoplastic elastomers, arranged, for example, in a side-by-side or sheath-core configuration.

The elastic and facing layers of the sheet can comprise the elastic or bicomponent fibers as defined, respectively, in addition to other fibers, but preferably consist of the elastic or bicomponent fibers as defined.

In one embodiment, the sheet comprises at least one facing layer on either side of the elastic layer, and hence at least three layers overall. This configuration is advantageous to cover the inherently sticky elastic layer on both sides.

In embodiments, the additional facing layer may be configured as described above for the first facing layer. The facing layers on the different sides of the elastic layer may be the same, but may also be different. For example, one of the nonwoven facing layers may be a spunbonded nonwoven and the other nonwoven facing layer may be a different spunbonded nonwoven or a meltblown nonwoven.

The basis weight of each facing layer may be between 5-40 g/m$^2$, preferably between 8-30 g/m$^2$, more preferably between 10-25 g/m$^2$ and yet more preferably between 15-20 g/m$^2$. The basis weight of the elastic layer may be between 10-140 g/m$^2$, preferably between 20-120 g/m$^2$ and more preferably between 25 and 100 g/m$^2$.

The sheets typically comprise a pattern of macroscopic bonding points. In a preferred embodiment, the number of bonding points per cm$^2$ of fabric surface may be lower than 100 and preferably lower than 80, and on the other hand preferably higher than 20. The total area of the fabric surface taken up by the areal bonding points in one embodiment is less than 18% and preferably less than 15%, meaning that the bonding pattern is preferably relatively open.

In one embodiment, even though the sheets of the invention have an inherently high machine-directional stretching ability already, the sheet may further be activated by machine-directional pre-stretching as described in more detail further below.

The invention further proposes a method for manufacturing an elastically stretchable nonwoven sheet according to the invention, comprising the following in-line steps: (a1) spinning crimped multicomponent fibers, wherein at least one of the components of the crimped multicomponent fibers is a propylene-α-olefin copolymer, and laying them onto a moving spinbelt to form a web; (a2) spinning elastic fibers formed from a thermoplastic elastomer polymer material and laying them onto the surface of the web formed in step (a1) to form another web; (b) bonding the adjacent webs to form the elastically stretchable spunbonded nonwoven sheet.

The spinning of steps (a1) and (a2) involves extruding, quenching and drawing the fibers in a spunbonding machine. The fibrous webs formed in steps (a1) etc. are unbonded precursors to the nonwoven materials forming for the facing and elastic layers, respectively, of the nonwoven sheet after bonding step (b).

Bonding of step (b) is most preferably embossing. Specifically, the bonding can comprises an embossing of bonding points into the sheet, the embossing being effected by embossing projections that are arranged on the surface of at least one calender roll. Embodiments comprise ultrasonic bonding, where ultrasonic vibrations are introduced to the embossing projections. Other embodiments use thermal bonding where the embossing projections are heated.

In a preferred variant, the number of bonding points per cm$^2$ of fabric surface may be lower than 100. The total area of the fabric surface taken up by the areal bonding points is preferably less than 18% and more preferably less than 15%, meaning that the bonding pattern is relatively open.

In one embodiment, the method further comprises a step (a3) of spinning additional fibers, preferably crimped multicomponent fibers, wherein most preferably at least one of the components of the crimped multicomponent fibers is a propylene-α-olefin copolymer, and laying them onto the surface of the web formed in step (a2) to form yet another web. In this variant of the method, sheets according to preferred embodiments of the invention are provided, which have a sandwich structure of an elastic layer interposed between two facing layers.

In one embodiment, the method further comprises pre-compacting the web(s) of the facing layers. Preferably there is one pre-compacting step after every corresponding step, meaning step (a1) and, if applicable, step (a3). Pre-compacting preferably comprises passing the web(s) between two flat precompaction rollers. The linear pressure applied is preferably between 3-5 N/mm. The roller temperature may be between 50-110° C. and more preferably between 60-100° C. Due to an inherent stickiness of the fibers formed from thermoplastic elastomers, pre-compaction is not needed or feasible following step (a2).

In one embodiment, the method further comprises a step (c) of machine-directionally pre-stretching the sheet.

The machine-directional pre-stretch may, for example, be effected by machine-directionally pulling the material over sets of rollers with different speeds.

Another option to effect a machine-directional pre-stretch comprises mechanically activating the sheet in a mill comprising a pair of interacting rolls whose surfaces comprise interlocking annular ribs and grooves ("ring-rolling") or interlocking cross-directional ribs and grooves.

The machine-directional pre-stretch of step (c) may be carried out in-line or, alternatively, as a standalone process.

The extent of the machine-directional pre-stretch of the sheet during step (c) can have an influence on the extent to which the final sheet can be elastically stretched in machine direction. In one embodiment, during step (c), the sheet is hence pre-stretched in machine direction. The degree of machine-directional pre-stretch can be such that, for example, the sheet is stretched by 40-160%, preferably by 60-140%, more preferably by 80-120% of its original dimension.

In an alternative embodiment, the method is devoid of a machine-directional pre-stretching. Due to the particular choice of polymers in the bicomponent fibers, a machine-directional pre-stretch may not even be necessary to obtain suitable machine directional stretching properties, as opposed to materials of the prior art.

The invention is not limited to a two or three layer sheet. There can be more than three layers by having a further elastic layer or further facing layers or inelastic layers. Also within each layer, there may be two or more sub-layers of identical or similar kind formed by separate stages of fiber laydown in the production process.

The nonwoven sheets according to the invention are particularly suited for use in the manufacture of hygiene articles. For example, the nonwoven sheets can be used for the manufacture of a diaper pant comprising the sheet as an elastic waist material. Typical production processes currently employed in the industry in that application would require the material to be able to elastically stretch in MD.

Figure 2:
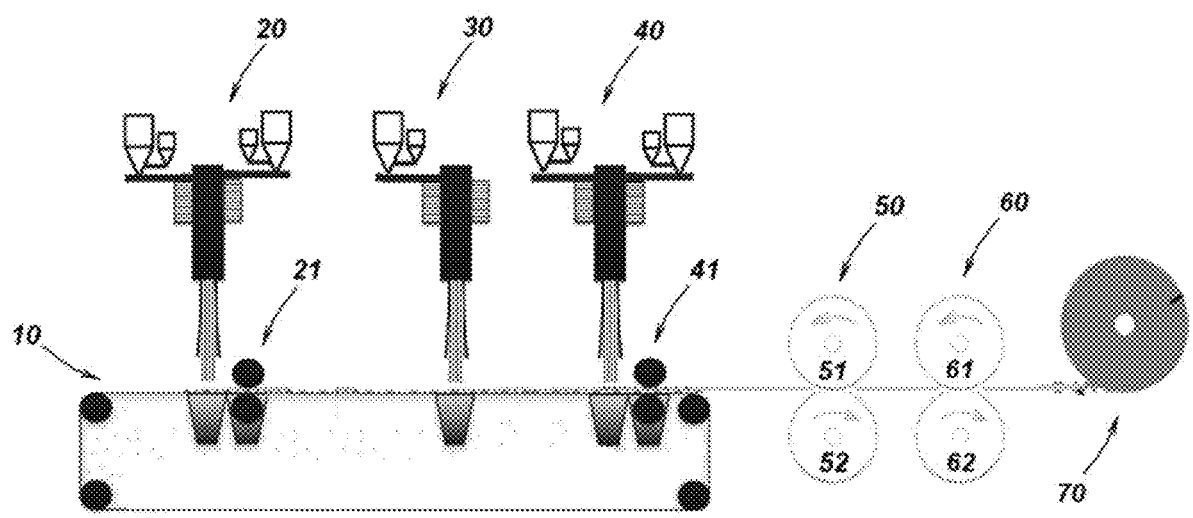
Figure 3:
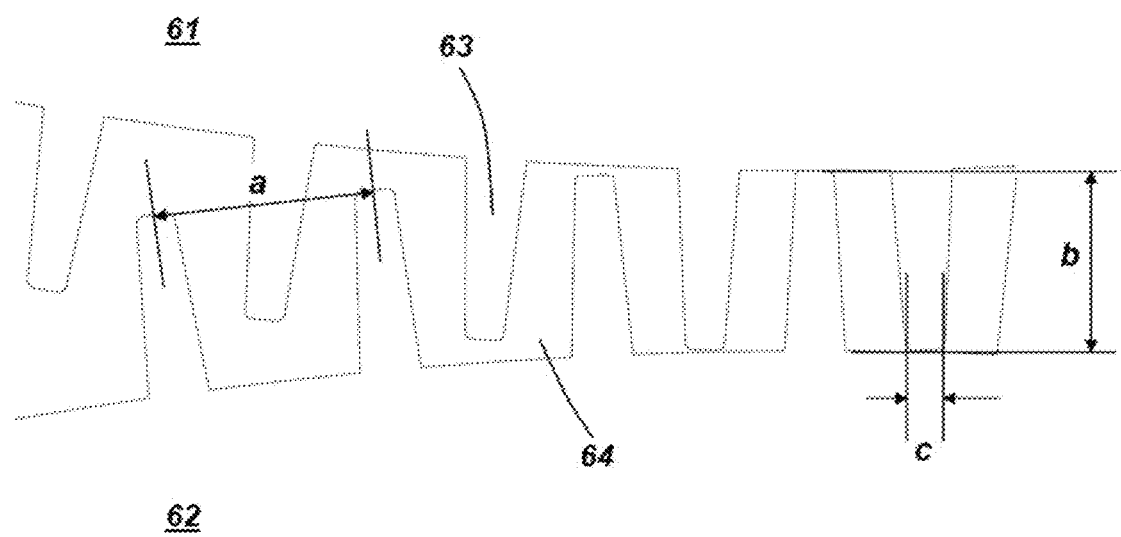
Figure 4:
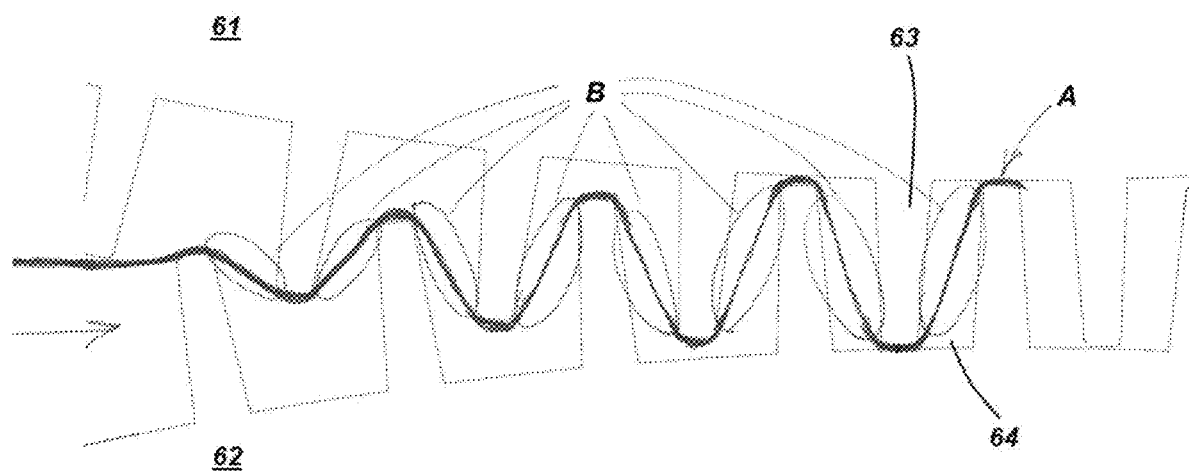
Figure 5:
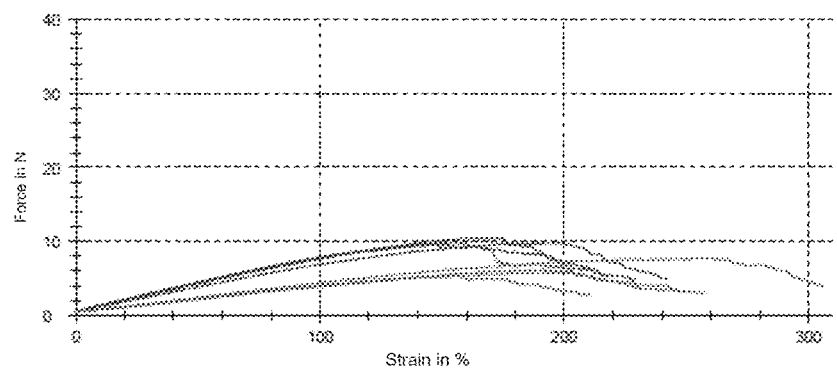
Figure 6:
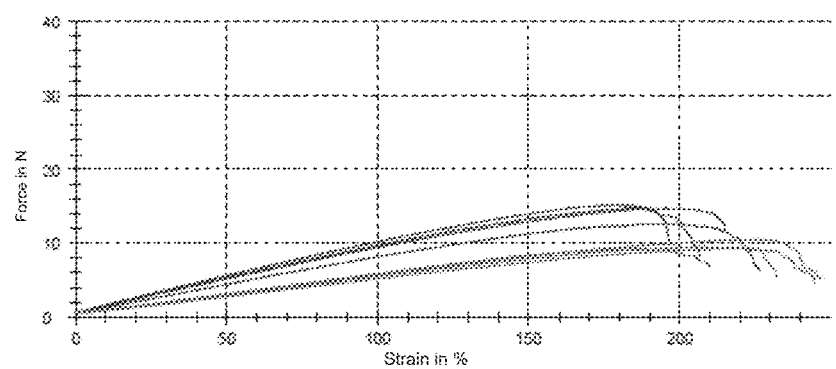
Figure 7:
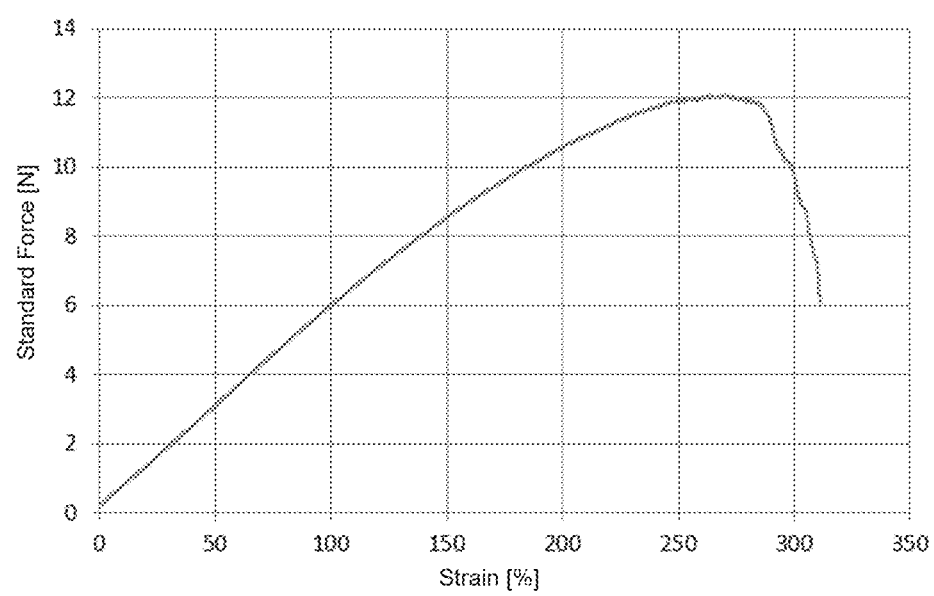
Figure 8:
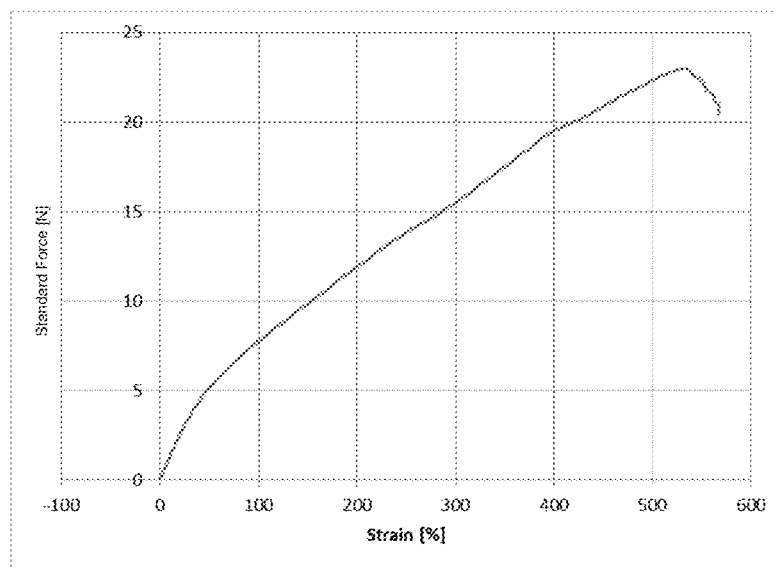
Figure 9:
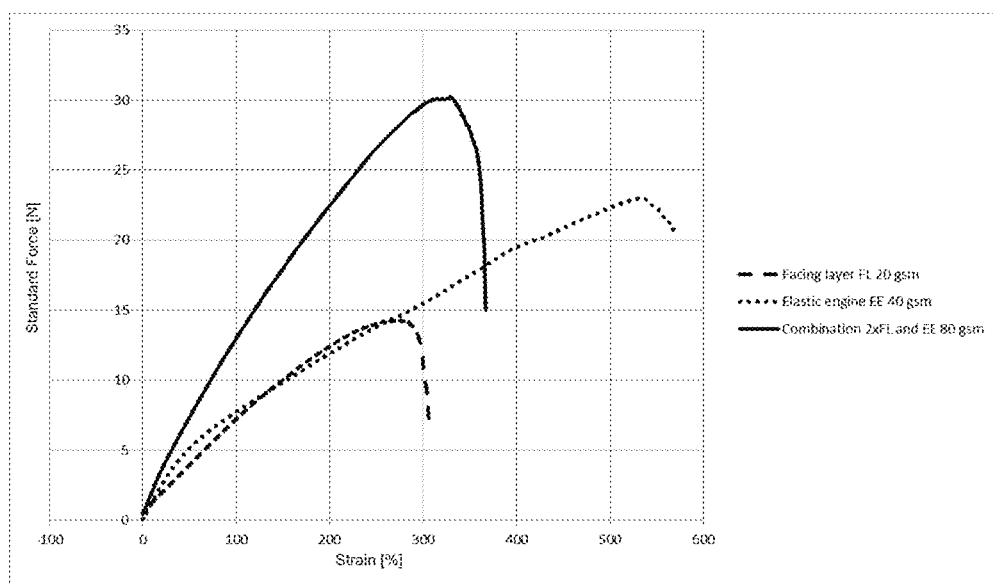
Figure 10:
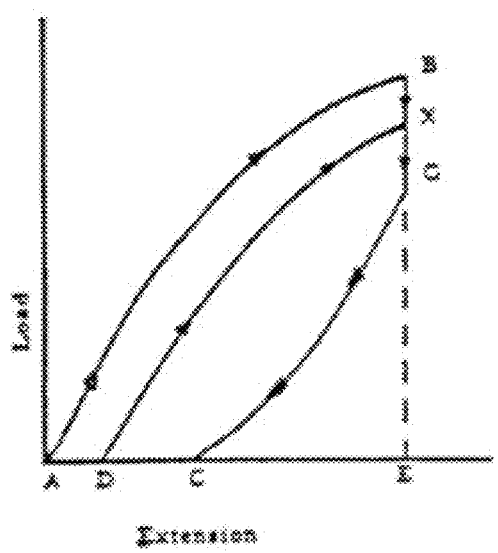
Figure 11:
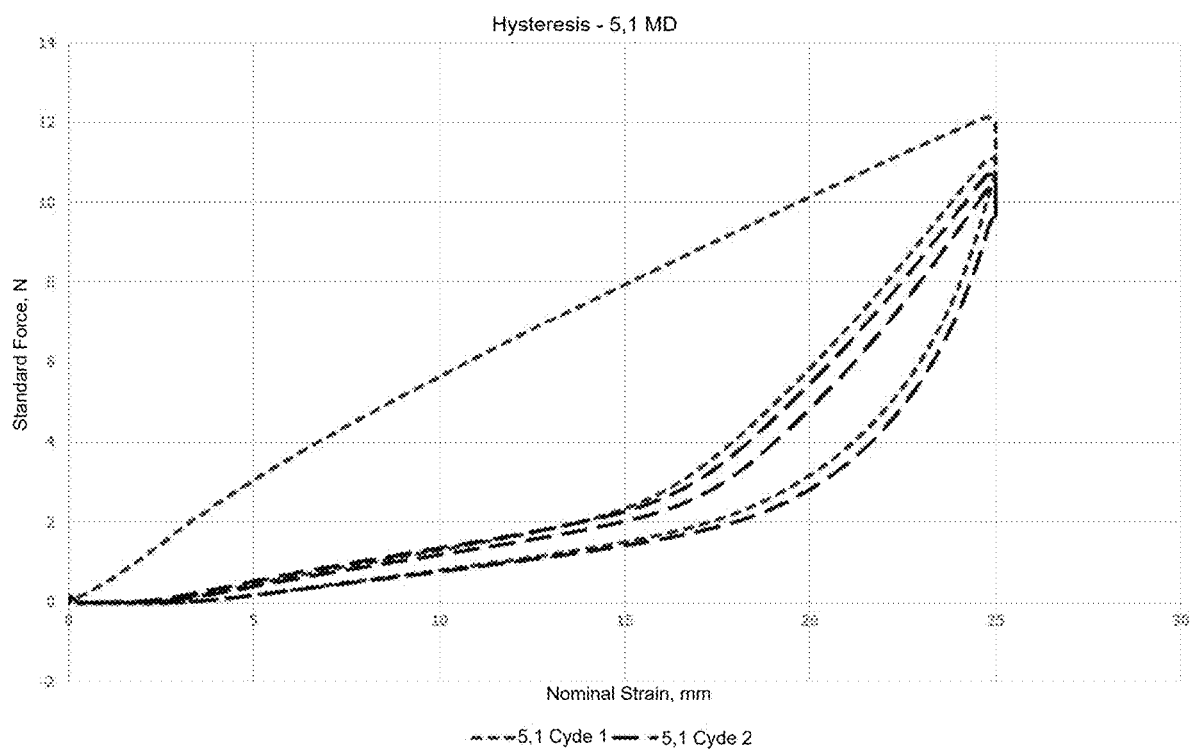

Further details and advantages of the invention will become apparent from the figures and examples described in the following. The figures show:

FIG. 1: a schematic cross-section of an elastically stretchable nonwoven sheet according to the invention;

FIG. 2: an exemplary machine setup for carrying out a method of the invention;

FIG. 3: a schematic illustration of a unit for activating, by stretch in machine direction, the sheet;

FIG. 4: a schematic illustration of a unit of FIG. 3 in operation;

FIG. 5: MD tensile (stress-strain) curves of an isolated facing spunbond layer according to a comparative configuration;

FIG. 6: MD tensile (stress-strain) curves of an isolated facing spunbond layer according to an inventive configuration;

FIG. 7: an MD tensile (stress-strain) curve of another isolated facing spunbond layer according to an inventive configuration;

FIG. 8: an MD tensile (stress-strain) curve of an isolated elastic spunbonded nonwoven layer;

FIG. 9: superimposed MD tensile (stress-strain) curves of a sheet according to the invention, an isolated facing layer of the sheet and an isolated elastic layer of the sheet;

FIG. 10: a schematic illustration of a tensile (stress-strain) diagram and increasing and decreasing curves of subsequent stress-strain cycles, representing the tests of ASTM D5459; and FIG. 11: a machine-directional tensile (stress-strain) plot for sample 5-1 of Example 5, showing a hysteresis curve for this material.

FIG. 1 shows a schematic cross-section of an elastically stretchable nonwoven sheet 100 according to the invention, where an elastic nonwoven layer comprising elastic fibers 130 is sandwiched between a first nonwoven facing layer 110 and a second nonwoven facing layer 120.

An exemplary machine setup for making an elastically stretchable nonwoven sheet 100 according to the invention is shown in FIG. 2.

The setup comprises a conveyor belt 10 and three spunbonding machines 20, 30 and 40 arranged in line on the conveyor belt.

In each of the spunbonding machines, a molten thermoplastic polymer is extruded through the holes of a die. The extruded fiber strands are then quenched and drawn/stretched to form endless fibers, which are then laid onto the conveyor belt 10 or a web that has been previously deposited thereon.

The first spunbonding machine 20 deposits a web of crimped bicomponent fibers on the conveyor belt 10. The two polymer feeds are symbolized at the top of the first spunbonding machine 20. The middle spunbonding machine 30 deposits a web of fibers formed from a thermoplastic elastomer on the previously formed web. The last spunbonding machine 40 deposits another web of again crimped bicomponent fibers on the elastic fiber web. Each of the spunbonding machines 20 and 40 is followed by a pair of pre-compaction rollers 21 and 41, respectively, for pre-compacting the respective webs.

The pre-compacted web is then calendered in a calendering unit 50 comprising a pair of counter-rotating embossing rollers 51, 52 to form a nonwoven sheet. The calendering is followed by an activation step in activation unit 60, which comprises a pair of counter-rotating activation rollers 61, 62 whose surfaces comprise interlocking structural elements, as described below in more detail. At the end of the overall in-line process, the product sheet is collected on the product roll 70.

FIG. 3 shows an embodiment of activation rollers 61, 62 of an activation unit 60 that is configured for increasing elasticity in machine direction. Specifically, the picture of FIG. 3 is an enlarged cross-section along a radial plane perpendicular to the roller axis. Both rollers 61 and 62 comprise a plurality of regularly spaced ribs 63 on their acting surfaces, between which grooves 65 are formed. The ribs 65 are oriented in cross-machine direction and extend axially over the surfaces of the rollers 61 and 62. The width of the ribs 63 is designated with letter "a", the depth of engagement is labelled with letter "b" and the distance between adjacent ribs is labelled with letter "c".

FIG. 4 shows a unit as shown in FIG. 3 in operation. From left to right in FIG. 4, the unactivated precursor sheet comprising two facing layers and an elastic layer sandwiched there between enters the activation process. As the sheet enters the nip of the two rollers 61, 62 the activation process is initiated with the sheet being locally stretched between the meshing ribs 63. The elastic layer during this process will elongate due to its elastic capability. The parameters "a", "b" and "c" can be varied as needed depending on the elongation property that may be imparted on and may be desired for the nonwoven sheet.

Even without being activated, using a combination of a polypropylene homopolymer with a relatively narrow molecular weight distribution and an ethylene-propylene random copolymer with a relatively broader molecular weight distribution in crimped bicomponent fibers has proven to deliver sheets that can be stretched without breaking in machine direction to a significant extent, in embodiments up to 300%. This is sufficient to meet any industry standard and to match the high elongation properties of an elastic nonwoven layer as used in the inventive sheets, which can in embodiments be elastically stretched for 400 to 500%.

The advantageous properties of the inventive sheets are demonstrated in the following examples.

A number of spunbonded facing layers using side-by-side bicomponent crimped fibers were prepared using the materials as specified below.

TABLE 1

Materials used:

| | Type | Polymer 1 | Polymer 2 | Ratio |
|---|---|---|---|---|
| Ex. 1 (comp.) | PP/PP | 511A | 511A (60%)/ HP522N (40%) | 70/30 |
| Ex. 2 | PP/CoPP | 511A | RP248R | 50/50 |
| Ex. 3 | PP/CoPP | 511A | QR674K | 50/50 |

The 511A polymer is a polypropylene homopolymer from the company Sabic with a narrow polymer weight distribution ($M_w/M_n$ is 3,8), a MFR of 25 g/10 min and a $T_m$ of 161° C.

The HP552N polymer is a polypropylene homopolymer from the company LyondellBasell with a broad polymer weight distribution ($M_w/M_n$ is 6,8), a MFR of 13 g/10 min and a $T_m$ of 161° C.

The RP248R polymer is an ethylene-propylene random copolymer from the company LyondellBasell with an MFR of 30 g/10 min, a medium molecular weight distribution ($M_w/M_n$ is 5,2) and a $T_m$ of 148° C. It further contains a clarifier and a slip agent.

The QR674K polymer is an ethylene-propylene random copolymer from the company Sabic with an MFR of 40 g/10 min, a broad molecular weight distribution ($M_w/M_n$ is 8,5) and a $T_m$ of 150° C. It also further contains a clarifier and a slip agent.

The melt flow rates (MFR) as used herein are to be understood as having been determined according to ISO 1133 with conditions being 230° C. and 2.16 kg.

The melting temperatures ($T_m$) as used herein are to be understood as having been determined with DSC according to ISO 11357-3.

The values for molecular weight averages ($M_w$ and $M_n$) and resulting values for molecular weight distribution (MWD, $M_w/M_n$) as used herein are to be understood as having been determined by GPC according to ISO 16014-1:2003, ISO 16014-2:2003, ISO 16014-4:2003 and ASTM D 6474-12 using the following formulae:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS} = 19 \times 10^{-3}$ mL/g, $a_{PS} = 0.655$ $K_{PE} = 39 \times 10^{-3}$ mL/g, $a_{PE} = 0.725$ $K_{PP} = 19 \times 10^{-3}$ mL/g, $a_{PP} = 0.725$ A third order polynomial fit was used to fit the calibration data.

All samples were prepared in the concentration range of 0.5 −1 mg/ml and dissolved at 160° C. for 2.5 hours.

Table 2 below shows properties that have been obtained for isolated 20 gsm spunbond facing sheets that have been obtained from these materials.

TABLE 2

Properties obtained:

| Basis weight | Thickness* | MD tensile at break** |

TABLE 2-continued

| Properties obtained: | | | |
|---|---|---|---|
| | (gsm) | (mm) | (N/50 mm) |
| Ex. 1 | 19.0 | 0.78 | 9.9 |
| Ex. 2 | 18.6 | 0.61 | 14.3 |
| Ex. 3 | 19.9 | 0.46 | 12.5 |
| | MD elongation at break** (%) | CD tensile at break** (N/50 mm) | CD elongation at break** (%) |
| Ex. 1 | 167 | 6.3 | 199 |
| Ex. 2 | 188 | 9.7 | 210 |
| Ex. 3 | 270 | 8.2 | 278 |

*Determined according to WSP120.6
**Determined according to WSP 100.4

Notably none of the samples have even been activated in a mill as shown in FIGS. 3 to 4, which had an open dot bonding pattern of 12% bonding area with 24 bond sites per cm² Example 1 is a comparative example. Examples 2-3 are inventive examples. The MD tensile (stress-strain) curves of the samples of comparative Examples 1-3 are shown in FIGS. 5 to 7, respectively, where FIGS. 5 and 6 show curves of multiple measurements that are then averaged, and FIG. 7 only shows one already averaged curve.

As apparent from the values in Table 2 and the curves in FIGS. 5-7, the MD elongation of the facing layer of Example 2 already is notably higher (by about 20%) than the elongation of the facing layer of comparative example 1. The facing layer according to the specifically preferred configuration of example 3, where the molecular weight distribution of the Co-PP is broader and the MWD difference between the PP and the Co-PP larger than in Example 2, the effect becomes very significant (another 80% improvement). Values for MD elongation at break of almost 200% (example 2), let alone of beyond 250% (Example 3), despite not even activated/pre-stretched, are quite unique for spunbonded materials where generally the fiber orientation is mainly in the machine direction. Also worth noting is that often the thickness of the facing layers are to some extent correlated to the level of crimp, but the thicknesses of the facing layers of Examples 2 and 3, despite having the same basis weight, are lower than the thickness of the facing layer of comparative example 1, such that there are apparently other effects beyond the simple crimp level that govern the ability of the inventively configured spunbonded facing layers to elongate in machine direction.

Next, as Example 4, three inventive sheets (Samples 4-1, 4-2 and 4-3) comprising an elastic spunbonded layer sandwiched between two inventively configured facing layers are manufactured on a line as shown in FIG. 2, except for the mill to activate the material (the sheet remained unactivated). The layers were prepared and configured as specified below. The Samples 4-1, 4-2 and 4-3 differ only by the basis weights of their layers.

TABLE 3

| Materials used/configuration in Example 4: | | | | | |
|---|---|---|---|---|---|
| | Type | Polymer 1 | Polymer 2 | Ratio | Basis weight (gsm) |
| | | | | | 4-1 \| 4-2 \| 4-3 |
| Facing layer 1 | PP/CoPP | 511A | QR674K | 50/50 | 20 \| 15 \| 10 |
| Elastic | Th-El. | Vistamax 7050BF | | | 40 \| 30 \| 20 |

TABLE 3-continued

| Materials used/configuration in Example 4: | | | | | |
|---|---|---|---|---|---|
| | Type | Polymer 1 | Polymer 2 | Ratio | Basis weight (gsm) |
| Facing layer 2 | PP/CoPP | 511A | QR674K | 50/50 | 20 \| 15 \| 10 |

Both facing layers of the sheet of Sample 4-1 correspond to the facing layers as investigated in an isolated manner in Example 3. The bonding pattern was as described above for the isolated facing layers.

The elastic layer was made from a single commercially available TPE-o material Vistamaxx™ 7050FL from ExxonMobil, which is a propylene-based thermoplastic elastomer copolymer with an ethylene content of 13 wt.-% and a melt flow rate of 45 g/10 min. The bonding pattern, again, was as described above.

Table 4 below shows properties that have been obtained for the three samples of Example 4.

TABLE 4

| Properties obtained: | | | |
|---|---|---|---|
| | Basis weight (gsm) | Thickness* (mm) | MD tensile at break** (N/50 mm) |
| Sample 4-1 | 77.8 | 0.78 | 30.5 |
| Sample 4-2 | 63.2 | 0.68 | 24.1 |
| Sample 4-3 | 44.8 | 0.56 | 18.7 |
| | MD elongation at break** (%) | CD tensile at break** (N/50 mm) | CD elongation at break** (%) |
| Sample 4-1 | 249 | 20.8 | 321 |
| Sample 4-2 | 203 | 16.6 | 270 |
| Sample 4-3 | 192 | 7.5 | 274 |

*Determined according to WSP120.6
**Determined according to WSP 100.4

As a variant to Example 4, in another Example 5, the same materials as in Example 4 were produced, with the difference that they were machine-directionally pre-stretched and activated in an activation unit 60 as shown in FIGS. 3 and 4. Specifically, already when entering the nip of the rollers of activation unit 60, the materials were machine-directionally pre-stretched by 100% (to 200% of their original length) by variation of translation speed in the line. In the activation unit, the depth of engagement "b" was 2 mm (at a total height of the ribs of 5 mm).

Table 5 below shows properties that have been obtained for the three samples of Example 5.

TABLE 5

| Properties obtained: | | | |
|---|---|---|---|
| | Basis weight (gsm) | Thickness* (mm) | MD tensile at break** (N/50 mm) |
| Sample 5-1 | 76.8 | 0.88 | 28.3 |
| Sample 5-2 | 61.2 | 0.75 | 26.3 |
| Sample 5-3 | 42.3 | 0.60 | 17.2 |
| | MD elongation at break** | CD tensile at break** | CD elongation at |

TABLE 5-continued

| | Properties obtained: | | |
|---|---|---|---|
| | break** (%) | (N/50 mm) | break** (%) |
| Sample 5-1 | 209 | 12.7 | 295 |
| Sample 5-2 | 202 | 11.2 | 346 |
| Sample 5-3 | 188 | 6.0 | 325 |

*Determined according to WSP120.6
**Determined according to WSP 100.4

In addition to the inventive Examples 4 and 5, as Example 6, the isolated elastic layer of Example 4, sample 4-1 was also spun and investigated.

FIG. 8 shows an MD tensile (stress-strain) curve of this isolated 40 gsm elastic spunbonded nonwoven layer of Example 6. The material can be significantly elongated in MD before breaking, specifically, for over 500%, when applying a stress of 20-25 N/50 mm.

FIG. 9 shows superimposed MD tensile (stress-strain) curves of the inventive sheet of Example 4, sample 4-1, the facing layer of Example 3, and the elastic layer of Example 6. As apparent from the superimposed curves, the facing layers do not impose a limitation to the elastic profile of the elastic layer before a stretch of over 300% is reached. The sheet has a high elongation and is elastic meaning it will retract to its original state once relaxed.

The curves shown in FIGS. 8 and 9, as the curve of FIG. 7, is already an averaged curve over multiple measurements.

A further important parameter for the elastic materials herein is their permanent deformation as determined according to ASTM D5459. Permanent deformation is the increase in length, expressed as a % of the original length, by which an elastic material fails to return to the original length after subjected to the extensions prescribed in the test procedure in ASTM D5459. The lower the % of permanent deformation, the better is the elasticity property of the elastic material.

FIG. 10 shows a schematic illustration of a tensile (stress-strain) diagram and increasing and decreasing curves of subsequent stress-strain cycles, representing the test of ASTM D5459. The permanent deformation is the value of (AD/AE)×100.

Another important parameter is the area between the increasing and decreasing stress-strain curves of a hysteresis plot in a second cycle of an ASTM D5459 test, as expressed in the relative size of the area between the curves (A) in relation to the overall area under the initial increasing curve (A+B), expressed in % [A/(A+B)×100]. It is to calculate the % of the energy dissipated due to internal friction. When the plots during loading and unloading do not coincide, as usually observed in real life materials, this means that a certain amount of energy is lost. The lower the %, the better the elastic property of the material.

FIG. 11 shows a machine-directional stress-strain plot for sample 5-1 of Example 5 obtained according to an ASTM D5459 test, first and second cycle. The hysteresis curve shows very desirable elastic properties of this material in machine direction. Specifically, the permanent deformation after the first cycle is only 1,28% and the area between the increasing and decreasing curves in the second cycle is only 24,8%.

The invention claimed is:

1. An elastically stretchable nonwoven sheet comprising at least three adjacent layers of nonwoven materials, wherein one of the three layers is an elastically stretchable nonwoven layer consisting of spunbonded elastic fibers formed from a thermoplastic elastomer polymer material,
wherein another two of the three layers are stretchable facing layers comprising spunbonded crimped multicomponent fibers,
wherein the sheet comprises a sandwich structure of the elastically stretchable nonwoven layer between one of the facing layers on either side thereof, and wherein the three adjacent layers are bonded together by areal bonding points that are embossed into the sheet by embossing projections that are arranged on a surface of at least one calender roll and which are heated or into which ultrasonic vibrations are introduced, wherein the number of bonding points per cm$^2$ of the sheet surface is between 20 and 100 and the total area of the sheet surface taken up by the areal bonding points is less than 18%,
wherein at least one of the components of the crimped multicomponent fibers is a propylene-α-olefin copolymer material and a further component of the crimped multicomponent fibers is a polypropylene homopolymer material, and an elongation at break of the sheet in machine direction is greater than 150% when measured according to WSP 100.4.

2. The sheet according to claim 1, wherein permanent deformation in machine direction, as measured according to ASTM D5459, after the first cycle is less than 15%.

3. The sheet according to claim 1, wherein the area between the increasing and decreasing machine-directional stress-strain curves of a hysteresis plot in a second cycle of an ASTM D5459 test, as expressed in the relative size of the area between the curves (A) in relation to the overall area under the initial increasing curve (A+B), expressed in % [A/(A+B)×100] is lower than 40%.

4. The sheet according to claim 1, wherein the propylene-α-olefin copolymer is a poly(propylene-ethylene) random copolymer.

5. The sheet according to claim 1, wherein the molecular weight distribution of the propylene-α-olefin copolymer is broader than the molecular weight distribution of the other component(s) of the crimped multicomponent fibers.

6. The sheet according to claim 1, wherein the crimped multicomponent fibers are bicomponent fibers.

7. The sheet according to claim 1, wherein the thermoplastic elastomer polymer material forming for the elastic fibers is a thermoplastic polyolefin elastomer.

8. The sheet according to claim 1, wherein basis weight of each of the facing layers is between 5-40 g/m$^2$ and/or wherein the basis weight of the elastically stretchable nonwoven layer is between 10-140 g/m$^2$.

9. A method for manufacturing an elastically stretchable nonwoven sheet according to claim 1, the method comprising the following in-line steps:
(a1) spinning crimped multicomponent fibers, wherein at least one of the components of the crimped multicomponent fibers is a propylene-α-olefin copolymer, and laying them onto a moving spinbelt to form a web;
(a2) spinning elastic fibers formed from a thermoplastic elastomer polymer material and laying them onto the surface of the web formed in step (a1) to form another web;
(a3) spinning crimped multicomponent fibers, wherein at least one of the components of the crimped multicomponent fibers is a propylene-α-olefin copolymer, and laying them onto the surface of the web formed in step (a2) to form another web;

(b) bonding the adjacent webs to form the elastically stretchable spunbonded nonwoven sheet, the bonding comprises an embossing of bonding points into the sheet, the embossing being effected by embossing projections that are arranged on the surface of at least one calender roll.

10. The method of claim 9, further comprising an in-line or off-line step (c) of machine-directionally pre-stretching the sheet.

11. The method of claim 10, wherein, during step (c), the sheet is machine-directionally pre-stretched by 40-160% of its original dimension.

12. A method of manufacturing hygiene articles, the method comprising manufacturing the hygiene articles utilizing the elastically stretchable nonwoven sheet of claim 1.

13. The sheet according to claim 1, wherein permanent deformation in machine direction, as measured according to ASTM D5459, after the first cycle is less than 10%.

14. The sheet according to claim 1, wherein the area between the increasing and decreasing machine-directional stress-strain curves of a hysteresis plot in a second cycle of an ASTM D5459 test, as expressed in the relative size of the area between the curves (A) in relation to the overall area under the initial increasing curve (A+B), expressed in % [A/(A+B)×100] is lower than 30%.

15. The sheet according to claim 1, wherein the crimped multicomponent fibers are bicomponent fibers that are side-by-side bicomponent fibers.

16. The sheet according to claim 1, wherein the thermoplastic elastomer polymer material forming for the elastic fibers is a thermoplastic polyolefin elastomer comprising propylene-α-olefin copolymers.

17. The sheet according to claim 1, wherein the elongation at break of the sheet in machine direction is greater 200% when measured according to WSP 100.4.

* * * * *